(12) United States Patent
Stojkovic

(10) Patent No.: US 9,120,441 B1
(45) Date of Patent: Sep. 1, 2015

(54) BATTERY SUPPORT ASSEMBLY

(71) Applicant: Ford Global Technologies, LLC, Dearborn, MI (US)

(72) Inventor: Dragan B. Stojkovic, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/317,358

(22) Filed: Jun. 27, 2014

(51) Int. Cl.
*B60R 16/04* (2006.01)
*B60K 11/04* (2006.01)
*B62D 29/00* (2006.01)
*B62D 25/08* (2006.01)

(52) U.S. Cl.
CPC .............. *B60R 16/04* (2013.01); *B60K 11/04* (2013.01); *B62D 25/082* (2013.01); *B62D 29/008* (2013.01)

(58) Field of Classification Search
CPC . B60R 16/04; H01M 2/1083; H01M 2220/20
USPC ........................................................ 180/68.5
See application file for complete search history.

(56) References Cited

U.S. PATENT DOCUMENTS

| | | | | |
|---|---|---|---|---|
| 4,327,809 A * | 5/1982 | Fenstermaker | | 180/68.5 |
| 5,086,860 A * | 2/1992 | Francis et al. | | 180/68.5 |
| 5,547,036 A * | 8/1996 | Gawaskar et al. | | 180/68.5 |
| 6,290,013 B1 * | 9/2001 | Bienenstein, Jr. | | 180/68.5 |
| 6,371,229 B1 * | 4/2002 | Kakiuchi | | 180/65.25 |
| 6,416,119 B1 | 7/2002 | Gericke et al. | | |
| 6,827,168 B2 * | 12/2004 | Miyazaki | | 180/68.5 |
| 7,185,724 B2 * | 3/2007 | Dupuis et al. | | 180/68.5 |
| 7,390,056 B1 * | 6/2008 | Stojkovic et al. | | 296/203.02 |
| 7,469,763 B2 * | 12/2008 | Dupuis et al. | | 180/68.5 |
| 7,836,989 B2 * | 11/2010 | Reed et al. | | 180/68.5 |
| 7,836,990 B2 * | 11/2010 | Reed et al. | | 180/68.5 |
| 8,196,691 B2 * | 6/2012 | Moine-Picard et al. | | 180/68.5 |
| 8,522,904 B2 * | 9/2013 | Strock | | 180/68.5 |
| 8,596,397 B2 * | 12/2013 | Sakamoto | | 180/68.5 |
| 8,822,056 B2 * | 9/2014 | Brewer et al. | | 429/100 |
| 8,955,630 B2 * | 2/2015 | Stuckey et al. | | 180/68.5 |
| 9,017,845 B2 * | 4/2015 | Bender et al. | | 429/100 |
| 2005/0224268 A1 * | 10/2005 | Dupuis et al. | | 180/68.5 |
| 2006/0061137 A1 * | 3/2006 | Stojkovic et al. | | 296/198 |
| 2008/0093236 A1 * | 4/2008 | Connelly et al. | | 206/308.1 |
| 2009/0000841 A1 * | 1/2009 | Reed et al. | | 180/68.5 |
| 2009/0004554 A1 * | 1/2009 | Reed et al. | | 429/97 |
| 2010/0193271 A1 * | 8/2010 | Moine-Picard et al. | | 180/68.5 |
| 2013/0037335 A1 * | 2/2013 | Sakamoto | | 180/65.8 |
| 2013/0056293 A1 | 3/2013 | Schurna et al. | | |

OTHER PUBLICATIONS

Ford Motor Company Limited, 2013 F150 Battery Tray, Copyright 2011.

\* cited by examiner

*Primary Examiner* — Hau Phan
*Assistant Examiner* — Jacob Meyer
(74) *Attorney, Agent, or Firm* — Raymond L. Coppiellie; Brooks Kushman P.C.

(57) ABSTRACT

A battery support assembly adapted to be attached to a front rail of a pickup truck is provided which may include a first support, a second support, and a battery tray. The first support may define an outwardly facing first vertical attachment flange. The second support may define an outwardly facing second vertical attachment flange. The battery tray may secured to the supports and disposed rearward and inboard of the rail. The first and second vertical attachment flanges may be offset vertically, laterally, and longitudinally relative to one another. The first vertical attachment flange may define a first plane and the second vertical attachment flange may define a second plane. The first and second planes may be substantially parallel to one another.

19 Claims, 3 Drawing Sheets

BATTERY SUPPORT ASSEMBLY

TECHNICAL FIELD

The present disclosure relates to assemblies for supporting a battery within a pickup truck engine compartment.

BACKGROUND

Pickup trucks are motor vehicles with a front passenger area, often referred to as a cab, and an open top rear cargo area, often referred to as a box. The box usually has a substantially flat bed from which two side body panels and a forward interconnecting header extend upwardly therefrom. Pickup trucks may also employ a bottom hinged door, commonly referred to as a tailgate, hinged at the rear edge of the bed and closable to provide a fourth wall for the cargo area. Cabs and boxes may be separate assemblies or part of the same unibody structure. Pickup trucks are popular largely because the box allows them to be utilized in many different ways, including carrying a variety of types of cargo and towing various types of trailers.

Stamped pickup truck box body panels may often be made from steel sheet metal which may be formed in a draw operation. Characteristics and properties of the steel sheet metal provide multiple options for forming vehicle components. Aluminum sheet metal does not share the same or similar formability characteristics and properties as steel sheet metal. While weight advantages may be obtained by using aluminum sheet metal instead of steel sheet metal, certain constraints relating to the formability of aluminum may require additional structural reinforcement. For example, corners of a pickup truck box are difficult to integrally form and also receive tailgate and user generated loads which require reinforcement to meet performance requirements. The corners also include an A-surface which has certain fit and finish requirements which may not be compromised by certain reinforcement options which result in deformation or other aesthetically displeasing marks.

This disclosure is directed to solving the above problems and other problems as summarized below.

SUMMARY

According to an aspect of the present disclosure, a battery support assembly adapted to be attached to a front rail of a pickup truck includes a first support, a second support, and a battery tray. The first support defines an outwardly facing first vertical attachment flange. The second support defines an outwardly facing second vertical attachment flange. The battery tray is secured to the supports and disposed rearward and inboard of the rail. The first and second vertical attachment flanges are offset vertically, laterally, and longitudinally relative to one another. The front rail may also include a first end, a second end, and a middle portion therebetween. The first end may be secured adjacent to an A-pillar region of the truck. The second end may be secured to a radiator support of the truck. The middle portion may extend from the first end substantially parallel to a forward body side panel of the truck and curve transversely inboard and downward such that the rail is spaced apart from a headlight of the truck. The supports may each further include a horizontal attachment flange disposed rearward of the middle portion and inboard of the first end of the front rail. The horizontal attachment flanges may be secured to one another and the battery tray. The front rail may include first and second inboard rail portions proximate to the first and second vertical attachment flanges. The first and second vertical flanges may be secured to the respective outboard portions of the front rail such that the first and second inboard rail portions are accessible from the outboard side of the front rail during assembly. The first vertical attachment flange may define a first plane and the second vertical attachment flange may define a second plane. The first and second planes may be substantially parallel to one another. The first and second supports supporting the battery tray and the first and second vertical attachment flanges being offset vertically, laterally, and longitudinally relative to one another may prevent the battery tray from pivoting relative to the front rail.

According to another aspect of the present disclosure, an engine compartment assembly for a pickup truck includes an A-pillar region, a body side panel, a wheel splash shield, a headlight, a frame member, and a battery support assembly. The body side panel includes a rear panel end secured at the A-pillar region and a forward panel end. The wheel splash shield is secured to the panel. The headlight is secured to the forward panel end. The frame member includes a longitudinal portion extending from the A-pillar region to a curved portion. The curved portion is adjacent to the headlight and extends transversely inboard and downward to a radiator support. The battery support assembly is disposed inboard of the longitudinal portion of the frame member and rearward of the curved portion of the frame member. The battery support assembly includes a battery tray, a first vertical attachment flange secured to a first outboard region of the longitudinal portion of the frame member, and a second vertical attachment flange secured to a second outboard region of the curved portion of the frame member. The first and second vertical attachment flanges are offset vertically, laterally, and longitudinally relative to each other. The longitudinal portion of the frame member may include an inboard region proximate to the first vertical attachment flange. The first vertical attachment flange may be secured to the first outboard region of the longitudinal portion of the frame member such that the inboard region of the frame member is not deformed. The first attachment flange may define a first plane and the second vertical attachment flange may define a second plane. The first and second planes may be substantially parallel to one another. The battery support assembly may include a lateral member defining the first vertical attachment flange, and the first vertical attachment flange may be secured to the first outboard region of the longitudinal portion of the frame member via one sided fasteners. The curved portion of the frame member may include an inboard region proximate to the second vertical attachment flange. The second vertical attachment flange may be secured to the second outboard region of the curved portion of the frame member such that the inboard region of the curved portion does not include one or more access holes for fastener assembly. The battery support assembly may include a longitudinal member defining the second vertical attachment flange. The longitudinal member may extend rearward from the second vertical attachment flange and may define an edge shaped to be spaced apart from a curvature of the wheel splash shield. The second attachment flange may be secured to the second outboard region of the curved portion of the frame member via one sided fasteners.

According to a further aspect of the present disclosure, an engine compartment assembly for a pickup truck includes an aluminum forward body side panel, a splash shield, an aluminum radiator support member, an aluminum frame member, and a battery support assembly. The aluminum forward body side panel includes a forward end, a rear end secured to an A-pillar region of the truck, and a rail extension extending along an upper portion of the panel. The splash shield is secured to the forward end of the panel. The aluminum radiator support member extends laterally from the splash shield and is oriented substantially perpendicular relative to the panel. The aluminum frame member includes a first portion extending longitudinally from an A-pillar region along the rail extension, a second portion curving transversely inboard from the first portion, and a third portion curving downwardly from the second portion to the radiator support member. The battery support assembly includes an aluminum lateral support, an aluminum longitudinal support, and a battery tray. The aluminum lateral support includes a first end defining a first mounting flange and is secured to a first outboard side of the first portion of the frame member. The aluminum lateral support also includes a middle portion extending at a downward angle from the first end to a second end. The aluminum longitudinal support has a first end defining a second mounting flange substantially parallel to the first mounting flange and is secured to a second outboard side of the third portion of the frame member. The aluminum longitudinal support also has a middle portion substantially parallel with the first portion of the frame member and extending rearward from the first end. A second end of the longitudinal support is secured to the second end of the lateral support. The battery tray is secured to at least one of the lateral or longitudinal supports. The first mounting flange and the second mounting flange are offset vertically, laterally, and longitudinally relative to each other. The first end of the lateral support may be secured to the first outboard side of the first portion of the frame member such that an inboard side of the first portion of the frame member proximate to the first end of the lateral support is not deformed. The first end of the lateral support may be secured to the first outboard side of the first portion of the frame member with one sided fasteners. The first end of the longitudinal support may be secured to the second outboard side of the third portion of the frame member such that an inboard side of the third portion of the frame member proximate to the first end of the longitudinal support is not deformed. The first end of the longitudinal support may be secured to the second outboard side of the third portion of the frame member with one sided fasteners. The second end of the lateral support may define a third mounting flange. The second end of the longitudinal support may extend from the middle portion of the longitudinal support to define a fourth mounting flange substantially parallel with the third mounting flange. The middle portion of the longitudinal support may define an edge substantially matching a curvature of the splash shield adjacent thereto.

The above aspects of the disclosure and other aspects will be apparent to one of ordinary skill in the art in view of the attached drawings and the following detailed description of the illustrated embodiments.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
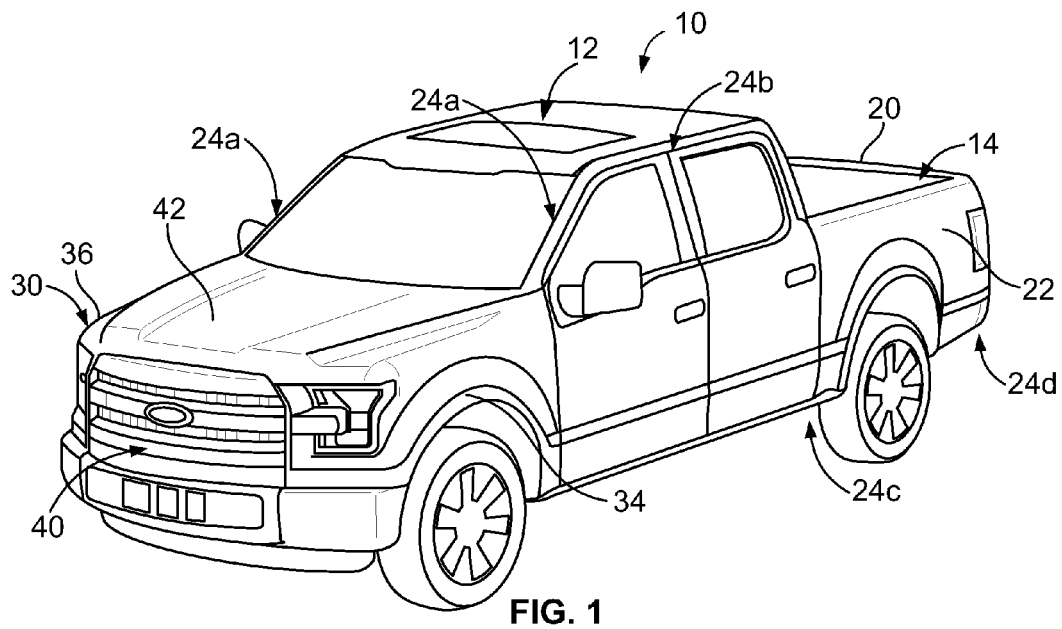
FIG. 1 is a perspective view of a vehicle.

Referring to FIG. 1, an example of a vehicle 10 is illustrated that includes a cabin 12 and a truck box 14 supported by a vehicle chassis (not shown). The vehicle 10 may be, for example, a pickup truck comprising a majority of aluminum components. The truck box 14 includes a bed (not shown) having a forward end adjacent to the cabin 12 and a rear end opposite the forward end. The bed supports a header (not shown) at the forward end and a tailgate 20 at the rear end. The tailgate 20 is mounted to the bed for rotation. The bed may also support body side panels, such as a rear body side panel 22. In this example, the vehicle 10 may include an A-pillar region 24a, a B-pillar region 24b, a C-pillar region 24c, and a D-pillar region 24d. The illustrated vehicle 10 is a four door configuration, however other configurations, such as a two door configuration may be adopted to incorporate the disclosed concepts. Alternate configurations may include different pillar region references than the vehicle 10. The rear body side panel 22 may be secured to the header at the C-pillar regions 24c. The tailgate 20 rotates from at least an open position to a closed position. A front end 30 of the vehicle 10 may be supported by a vehicle frame (not shown). The vehicle frame may also support forward body side panels 34 and 36, and a grill portion 40. A hood 42 is mounted to the vehicle 10 for rotation. The forward body side panels 34 and 36, the grill portion 40, and the hood 42 house an engine compartment region (not shown in this view). Components of the vehicle 10, such as the forward body side panel 34, the forward body side panel 36, and the hood 42 may be made of five thousand series or six thousand series aluminum alloy.

Aluminum alloys are generally identified by a four-digit number, the first digit of which typically identifies the major alloying element. When describing a series of aluminum alloys based on the major alloying element, the first number may be followed by three x's (upper or lower case) or three 0's (zeros). For example, the major alloying element in 6xxx or 6000 series aluminum alloy is magnesium and silicon, while the major alloying element of 5xxx or 5000 series is magnesium and for 7xxx or 7000 series is zinc. Additional numbers represented by the letter 'x' or number '0' in the series designation define the exact aluminum alloy. For example, a 6061 aluminum alloy has a composition of 0.4-0.8% Silicon, 0-0.7% Iron, 0.15-0.4% Copper, 0-0.15% Manganese, 0.8-1.2% Magnesium, 0.04-0.35% Chromium, 0-0.25% Zinc, and 0-0.15% Titanium. Different alloys provide different trade-offs of strength, hardness, workability, and other properties.

In addition, five basic temper designations may be used for aluminum alloys which are: F—as fabricated, O—annealed, H—strain hardened, T—thermally treated, and W—as quenched (between solution heat treatment and artificial or natural aging). The temper designation may be followed by a single or double digit number for further delineation. For example, aluminum with a T6 temper designation has been solution heat treated and artificially aged, but not cold worked after the solution heat treatment (or such that cold working would not be recognizable in the material properties).

Figure 2:
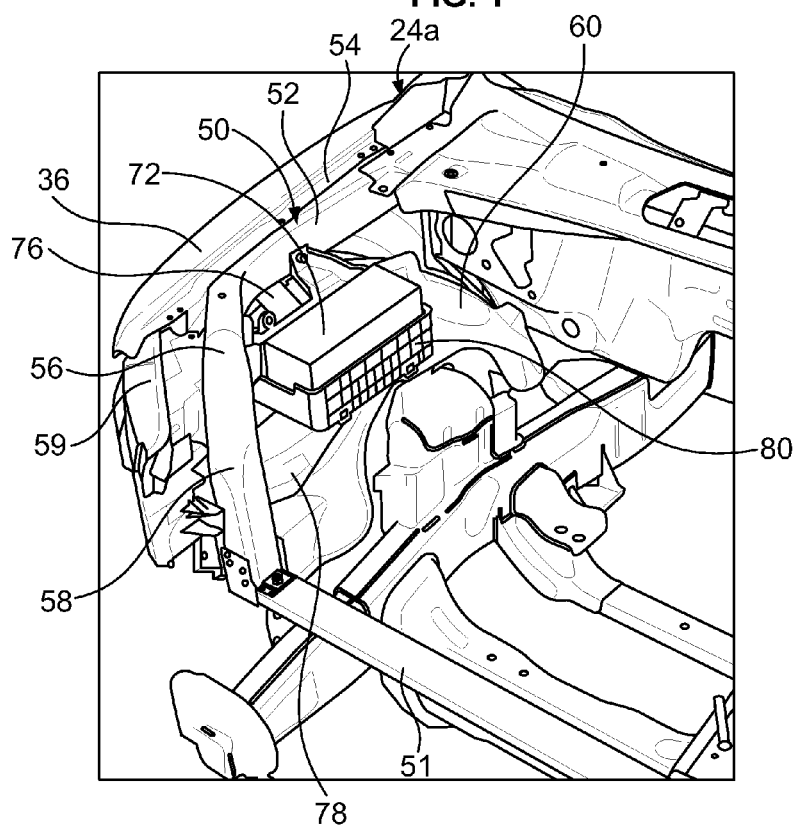
FIG. 2 is a fragmentary perspective view of an example of a portion of an engine compartment for the vehicle of FIG. 1 showing a battery support assembly and a battery.
Figure 3:
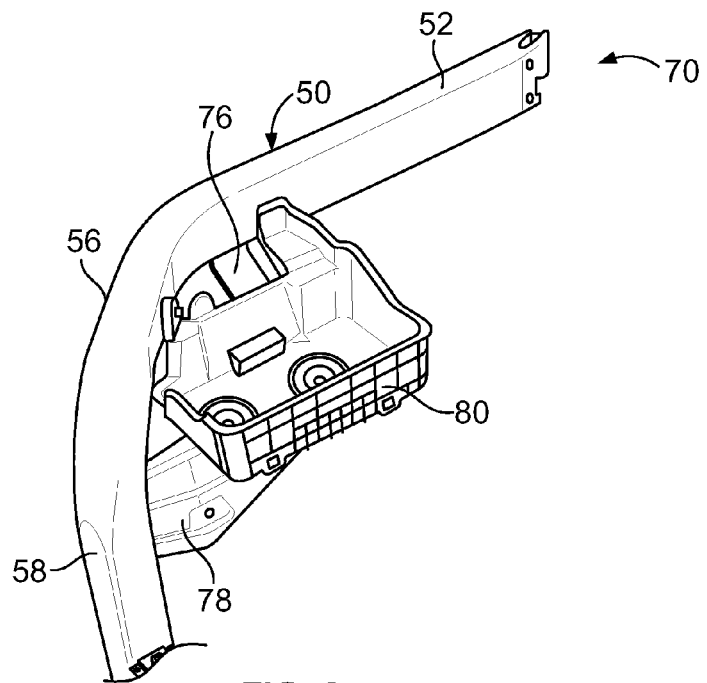
FIG. 3 is a front perspective view of the battery support assembly of FIG. 2 shown without the battery.
Figure 4:
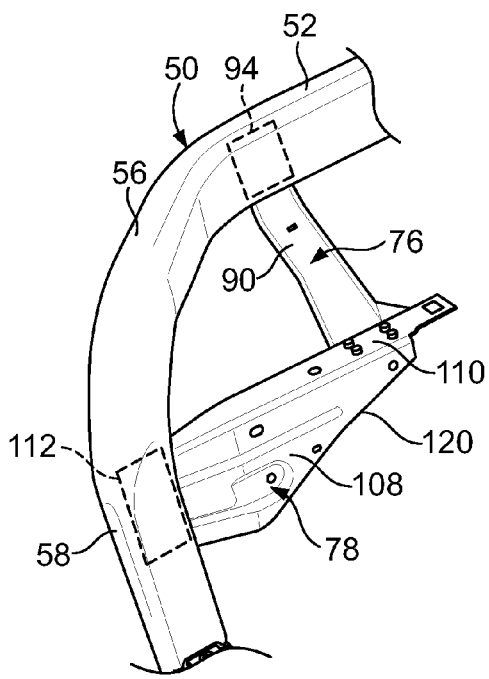
FIG. 4 is a front perspective view of the battery support assembly of FIG. 2 shown without a battery tray.
Figure 5:
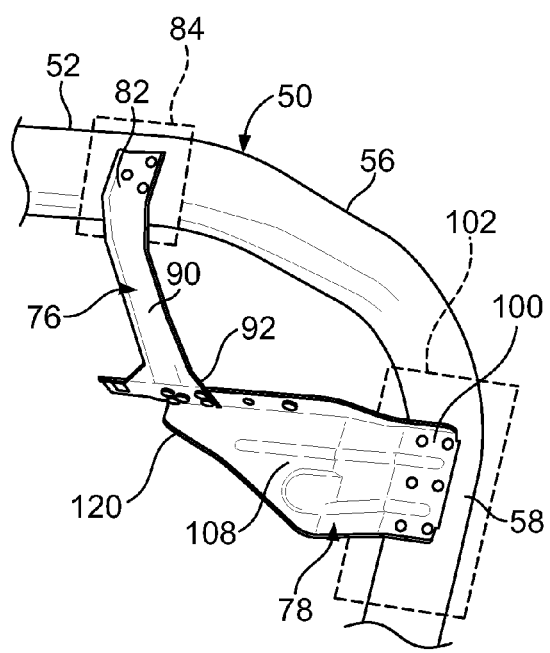
FIG. 5 is a rear perspective view of the battery support assembly of FIG. 2 shown without the battery tray.
Figure 6:
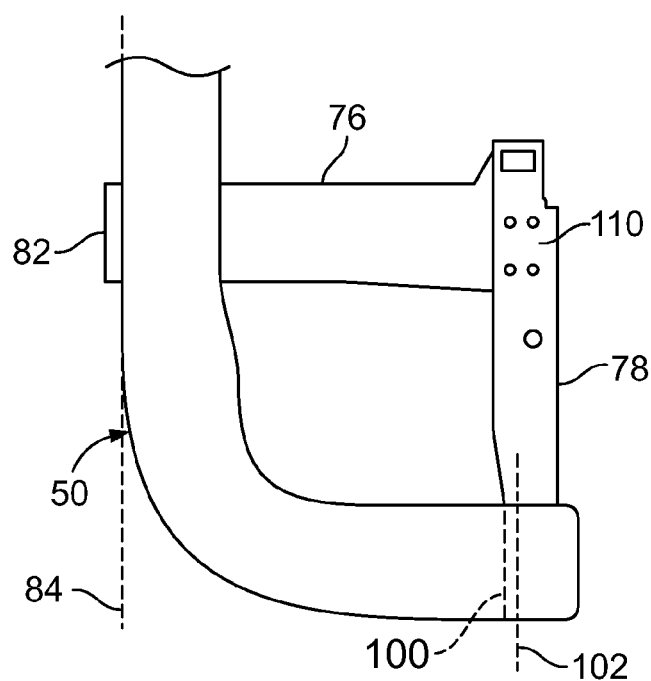
FIG. 6 is a plan view of the battery support assembly of FIG. 2 shown without the battery tray.
Figure 7:
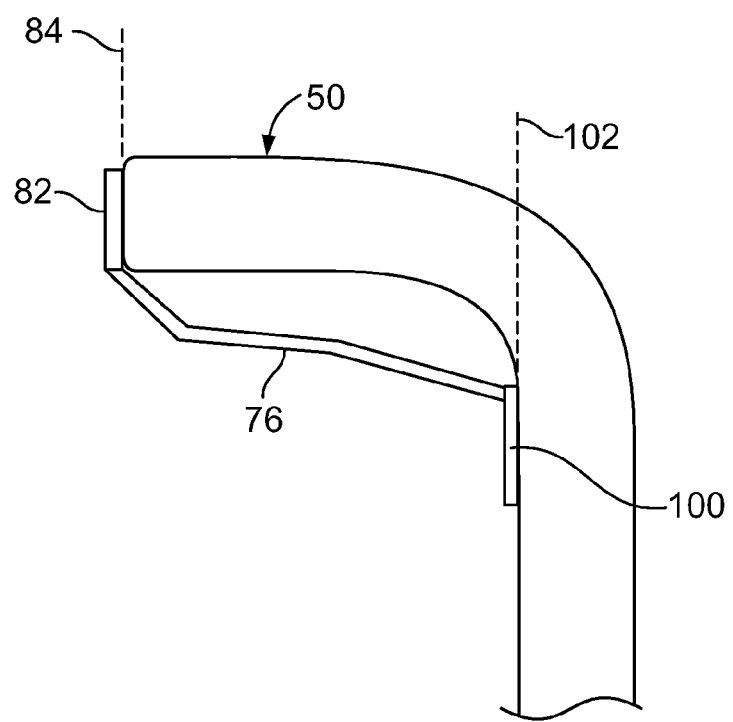
FIG. 7 is a front view of the battery support assembly of FIG. 2 shown without the battery tray.

FIG. 2 shows an example of a portion of an engine compartment for a vehicle such as the vehicle 10. An engine compartment frame member 50 extends from a portion of the A-pillar region 24*a* to a radiator support member 51. The engine compartment frame member 50 may also be referred to as a front rail. The engine compartment frame member 50 includes a first portion 52 extending longitudinally from a portion of the A-pillar region 24*a* along a rail extension 54 of the forward body side panel 36. The engine compartment frame member 50 also includes a second portion 56 curving transversely inboard from the first portion 52 and a third portion 58 curving downward from the second portion 56 to the radiator support member 51. The first portion 52 and the third portion 58 of the engine compartment frame member 50 are oriented to provide clearance and space for a headlight 59. The headlight 59 is secured to the forward body side panel 36 and the engine compartment frame member 50. A wheel splash shield 60 is secured to the forward body side panel 36 and the engine compartment frame member 50. The engine compartment frame member 50 supports components within the engine compartment and assists in providing structural rigidity to the engine compartment of the vehicle 10. The engine compartment frame member 50 may be hydroformed aluminum.

Now additionally referring to FIGS. 3 through 7, a battery support assembly 70 may support and retain a battery 72 within the engine compartment of the vehicle 10. The battery support assembly 70 includes the engine compartment frame member 50, a lateral member 76 and a longitudinal member 78 supporting a battery tray 80. The lateral member 76 and the longitudinal member 78 may also be referred to as support members. The lateral member 76 and the longitudinal member 78 may be five or six thousand series aluminum. The lateral member 76 includes a first end 82 which at least partially defines a plane 84. The first end 82 of the lateral member 76 may be a vertical or substantially vertical flange. The first end 82 of the lateral member 76 defines an attachment flange or mounting surface secured or joined to an outboard side of the first portion 52 of the engine compartment frame member 50. Pop rivets and flow drill screws are two examples of fasteners which may secure the first end 82 of the lateral member 76 to the outboard side of the first portion 52 of the engine compartment frame member 50. Joining methods may include Resistance Spot Welding (RSW), Self-Piercing Rivets (SPR) and the use of other fasteners such as bolts. During the process of assembly, access apertures may be required in some of the components to permit manufacturing tools access to join the components. A middle portion 90 curves from the first end 82 and extends downward at an angle to a second end 92 of the lateral member 76. The second end 92 of the lateral member 76 may be a horizontal or substantially horizontal flange. For example, the second end 92 of the lateral member 76 may be referred to as a horizontal attachment flange. An inboard portion 94 of the first portion 52 of the engine compartment frame member 50 is proximate to the first end 82 of the lateral member 76. The first end 82 of the lateral member 76 is secured to the outboard side of the first portion 52 of the engine compartment frame member 50 such that the inboard portion 94 is not deformed. For example, the inboard portion 94 does not include access holes and a usage of one sided fasteners does not pierce or deform the inboard portion 94.

The longitudinal member 78 includes a first end 100 which at least partially defines a plane 102. The plane 102 is substantially parallel with the plane 84 to provide mounting surfaces to assist in sharing a load from the battery 72 mounted to the battery support assembly 70. The first end 100 of the longitudinal member 78 may be a vertical or substantially vertical flange. The vertical attachment flange at the first end 82 of the lateral member 76 and the vertical attachment flange at the first end 100 of the longitudinal member 78 are offset vertically, laterally, and longitudinally relative to one another. Both of the vertical attachment flanges face outward which may assist in providing access during installation to the vehicle 10. The first end 100 of the longitudinal member 78 defines an attachment flange or mounting surface secured or joined to an outboard side of the third portion 58 of the engine compartment frame member 50. Pop rivets and flow drill screws are two examples of fasteners which may secure the first end 100 of the longitudinal member 78 to the outboard side of the third portion 58 of the engine compartment frame member 50. A middle portion 108 is substantially parallel with the first portion 52 of the engine compartment frame member 50. The middle portion 108 extends rearward from the first end 100 to a second end 110 of the longitudinal member 78. For example, the second end 110 of the longitudinal member 78 may be referred to as a horizontal attachment flange. An inboard portion 112 of the third portion 58 of the engine compartment frame member 50 is proximate to the first end 100 of the longitudinal member. The first end 100 of the longitudinal member 78 is secured to the outboard side of the third portion 58 of the engine compartment frame member 50 such that the inboard portion 112 is not deformed. For example, the inboard portion 112 does not include access holes and the usage of one sided fasteners does not pierce or deform the inboard portion 112. The second end 110 of the longitudinal member 78 is secured to the second end 92 of the lateral member 76. In one example, the second end 110 of the longitudinal member 78 is secured to the second end 92 of the lateral member 76 via rivets. A pierce nut may extend through the second end 110 of the longitudinal member 78 and the second end 92 of the lateral member 76. The battery tray 80 may be bolted to the pierce nut 116.

The middle portion 108 of the longitudinal member 78 defines an edge 120 which may be shaped to be spaced apart from a curvature of a surface of the wheel splash shield 60. The edge 120 may also be shaped to substantially match the curvature of the surface of the wheel splash shield 60. The second end 92 of the lateral member 76 and the second end 110 of the longitudinal member 78 each define mounting surfaces which define planes substantially parallel to one another.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A pickup truck battery support assembly comprising:
a first support defining a first vertical flange;
a second support defining a second vertical flange;
a front rail having first and second inboard portions proximate the flanges and respective outboard portions; and
a battery tray secured to the supports rearward and inboard of the rail, wherein the flanges are offset vertically, laterally, and longitudinally relative to one another and secured to the respective outboard portions.

2. The assembly of claim 1, wherein the front rail includes a first end, a second end, and a middle portion therebetween, the first end secured adjacent to an A-pillar region of the truck, the second end secured to a radiator support of the truck, and the middle portion extending from the first end substantially parallel to a forward body side panel of the truck and curving transversely inboard and downward such that the rail is spaced apart from a headlight of the truck.

3. The assembly of claim 2, wherein the supports each further comprise a horizontal attachment flange disposed rearward of the middle portion and inboard of the first end of the front rail, and wherein the horizontal attachment flanges are secured to one another and the battery tray.

4. The assembly of claim 1, wherein the first vertical flange defines a first plane and the second vertical flange defines a second plane, and wherein the first and second planes are substantially parallel to one another.

5. The assembly of claim 1, wherein the first and second supports supporting the battery tray and the first and second vertical flanges being offset vertically, laterally, and longitudinally relative to one another prevents the battery tray from pivoting relative to the front rail.

6. An engine compartment assembly for a pickup truck comprising:
an A-pillar region;
a body side panel including a rear panel end secured at the A-pillar region and a forward panel end;
a wheel splash shield secured to the panel;
a headlight secured to the forward panel end;
a frame member including a longitudinal portion extending from the A-pillar region to a curved portion, the curved portion adjacent to the headlight and extending transversely inboard and downward to a radiator support; and
a battery support assembly disposed inboard of the longitudinal portion of the frame member and rearward of the curved portion of the frame member, the battery support assembly including a battery tray, a first vertical attachment flange secured to a first outboard region of the longitudinal portion of the frame member, and a second vertical attachment flange secured to a second outboard region of the curved portion of the frame member, wherein the first and second vertical attachment flanges are offset vertically, laterally, and longitudinally relative to each other.

7. The assembly of claim 6, wherein the longitudinal portion of the frame member further comprises an inboard region proximate to the first vertical attachment flange, and wherein the first vertical attachment flange is secured to the first outboard region of the longitudinal portion of the frame member such that the inboard region of the frame member is not deformed.

8. The assembly of claim 7, wherein the first attachment flange defines a first plane, and wherein the second vertical attachment flange defines a second plane, and wherein the first and second planes are substantially parallel to one another.

9. The assembly of claim 8, wherein the battery support assembly further comprises a lateral member defining the first vertical attachment flange, and wherein the first vertical attachment flange is secured to the first outboard region of the longitudinal portion of the frame member via one sided fasteners.

10. The assembly of claim 6, wherein the curved portion of the frame member further comprises an inboard region proximate to the second vertical attachment flange, and wherein the second vertical attachment flange is secured to the second outboard region of the curved portion of the frame member such that the inboard region of the curved portion does not include one or more access holes for fastener assembly.

11. The assembly of claim 10, wherein the battery support assembly further comprises a longitudinal member defining the second vertical attachment flange, and wherein the longitudinal member extends rearward from the second vertical attachment flange and further defines an edge shaped to be spaced apart from a curvature of the wheel splash shield.

12. The assembly of claim 11, wherein the second attachment flange is secured to the second outboard region of the curved portion of the frame member via one sided fasteners.

13. An engine compartment assembly for a pickup truck comprising:
an aluminum forward body side panel including a forward end and a rear end secured to an A-pillar region of the truck and including a rail extension extending along an upper portion of the panel;
a splash shield secured to the forward end of the panel;
an aluminum radiator support member extending laterally from the splash shield and oriented substantially perpendicular relative to the panel;
an aluminum frame member including a first portion extending longitudinally from an A-pillar region along the rail extension, a second portion curving transversely inboard from the first portion, and a third portion curving downwardly from the second portion to the radiator support member; and
a battery support assembly including an aluminum lateral support having a first end defining a first mounting flange and secured to a first outboard side of the first portion of the frame member, a middle portion extending at a downward angle from the first end to a second end, an aluminum longitudinal support having a first end defining a second mounting flange substantially parallel to the first mounting flange and secured to a second outboard side of the third portion of the frame member, a middle portion substantially parallel with the first portion of the frame member and extending rearward from the first end, and a second end secured to the second end of the lateral support, and the assembly including a battery tray secured to at least one of the lateral or longitudinal supports, wherein the first mounting flange and the second mounting flange are offset vertically, laterally, and longitudinally relative to each other.

14. The engine compartment assembly of claim 13, wherein the first end of the lateral support is secured to the first outboard side of the first portion of the frame member such that an inboard side of the first portion of the frame member proximate to the first end of the lateral support is not deformed.

15. The engine compartment assembly of claim 14, wherein the first end of the lateral support is secured to the first outboard side of the first portion of the frame member with one sided fasteners.

16. The engine compartment assembly of claim 13, wherein the first end of the longitudinal support is secured to the second outboard side of the third portion of the frame member such that an inboard side of the third portion of the frame member proximate to the first end of the longitudinal support is not deformed.

17. The engine compartment assembly of claim 16, wherein the first end of the longitudinal support is secured to the second outboard side of the third portion of the frame member with one sided fasteners.

18. The engine compartment assembly of claim 13, wherein the second end of the lateral support defines a third mounting flange, and wherein the second end of the longitudinal support extends from the middle portion of the longitudinal support to define a fourth mounting flange substantially parallel with the third mounting flange.

19. The engine compartment assembly of claim 13, wherein the middle portion of the longitudinal support defines an edge substantially matching a curvature of the splash shield adjacent thereto.

* * * * *